(12) United States Patent
Miller et al.

(10) Patent No.: US 10,833,592 B2
(45) Date of Patent: Nov. 10, 2020

(54) POWER CONVERTER WITH SWITCHABLE TOPOLOGY

(71) Applicant: International Business Machines Corporation, Armonk, NY (US)

(72) Inventors: Michael L. Miller, Rochester, MN (US); Patrick K. Egan, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/539,126

(22) Filed: Aug. 13, 2019

(65) Prior Publication Data

US 2020/0177088 A1 Jun. 4, 2020

Related U.S. Application Data

(63) Continuation of application No. 16/204,338, filed on Nov. 29, 2018, now Pat. No. 10,491,129.

(51) Int. Cl.
*H02M 3/335* (2006.01)
(52) U.S. Cl.
CPC ............... *H02M 3/33576* (2013.01)
(58) Field of Classification Search
CPC ............ H02M 1/10; H02M 3/33569; H02M 7/53873; H02M 2001/007; H02J 3/383
USPC ................... 323/222, 225, 268, 271
See application file for complete search history.

(56) References Cited

U.S. PATENT DOCUMENTS

| 5,245,520 | A | 9/1993 | Imbertson |
| 6,215,683 | B1 | 4/2001 | Mao |
| 6,469,915 | B2 | 10/2002 | Huang et al. |
| 8,085,556 | B2 | 12/2011 | Moussaoui |
| 8,278,997 | B1 | 10/2012 | Kim et al. |
| 8,344,638 | B2* | 1/2013 | Shteynberg ....... H02M 3/33507 315/247 |
| 8,456,865 | B1 | 6/2013 | Bianchi et al. |
| 8,482,924 | B2 | 7/2013 | Redpath |
| 8,610,410 | B2 | 12/2013 | Taneja |
| 9,035,626 | B2 | 5/2015 | Stratakos et al. |
| 9,299,524 | B2 | 3/2016 | Divan |
| 9,455,637 | B2 | 9/2016 | Hung et al. |
| 9,621,052 | B2 | 4/2017 | Karlsson et al. |
| 9,866,106 | B2 | 1/2018 | Hsu et al. |
| 9,899,926 | B2 | 2/2018 | Kojima |
| 2006/0120123 | A1* | 6/2006 | Phadke ............... H02M 3/1588 363/125 |
| 2014/0036545 | A1 | 2/2014 | Reddy |

(Continued)

OTHER PUBLICATIONS

Prasai et al., *Zero-Energy Sag Corrector With Reduced Device Count*, IEEE Transactions on Power Electronics, vol. 24, No. 6, IEEE, DOI: 10.1109/TPEL.2009.2015319, Jun. 12, 2009, 8 pages.

(Continued)

*Primary Examiner* — Emily P Pham
(74) *Attorney, Agent, or Firm* — Nathan M. Rau

(57) ABSTRACT

Switching between a dual switch topology and a bridge forward topology in a power converter includes: receiving an input voltage; providing, via the dual switch topology, an output voltage; determining that the input voltage falls below a first threshold; switching a path of the input voltage from the dual switch topology to the bridge forward topology; and providing, via the bridge forward topology, the output voltage.

20 Claims, 6 Drawing Sheets

(56) References Cited

U.S. PATENT DOCUMENTS

2014/0043863 A1  2/2014  Telefus et al.
2015/0372605 A1  12/2015  Karlsson et al.
2016/0065076 A1  3/2016  Yamashita

OTHER PUBLICATIONS

Kan et al., *A Flexible Topology Converter for Photovoltaic Micro-inverter*, 2017 20th International Conference on Electrical Machines and Systems (ICEMS), IEEE, DOI: 10.1109/ICEMS.2017.8055971, Date Added to IEEE Xplore: Oct. 5, 2017, 5 pages.
U.S. Appl. No. 16/204,338, to Michael L. Miller, entitled, *Power Converter With Switchable Topology*, assigned to International Business Machines Corporation, 27 pages, filed Nov. 29, 2018.
P201800350US02, Appendix P; List of IBM Patents or Applications Treated as Related, Aug. 13, 2019, 2 pages.

* cited by examiner

POWER CONVERTER WITH SWITCHABLE TOPOLOGY

CROSS-REFERENCE TO RELATED APPLICATION

This application is a continuation application of and claims priority from U.S. patent application Ser. No. 16/204,338, filed Nov. 29, 2018.

BACKGROUND

Field of the Invention

The field of the invention is power converters, or, more specifically, methods, apparatus, and products for switching between a dual switch topology and a bridge forward topology of a power converter.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Power converters, also called power supplies, convert an input voltage into an output voltage required by an output load. Power converters are designed to run over a wide range of input voltages. Power converters also operate at varying duty cycles depending on the input voltage. The duty cycle describes the ratio of "on" time to "off" time for the transistors of the power converter. Power converters tend to be most efficient at higher duty cycles. However, the duty cycles of the power converter must also take into account storing energy in capacitors (e.g., bulk capacitors). Stored energy allows for a power converter to continue to supply output voltage during a period of reduced input voltage or a power outage. Thus, the operational parameters of a power converter must take into account both efficiency and the ability to provide output voltage during a power outage (e.g., "ride through" time).

SUMMARY

A method of switching between a dual switch topology and a bridge forward topology in a power converter may comprise: receiving an input voltage; providing, via the dual switch topology, an output voltage; determining that the input voltage falls below a first threshold; switching a path of the input voltage from the dual switch topology to the bridge forward topology; and providing, via the bridge forward topology, the output voltage.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
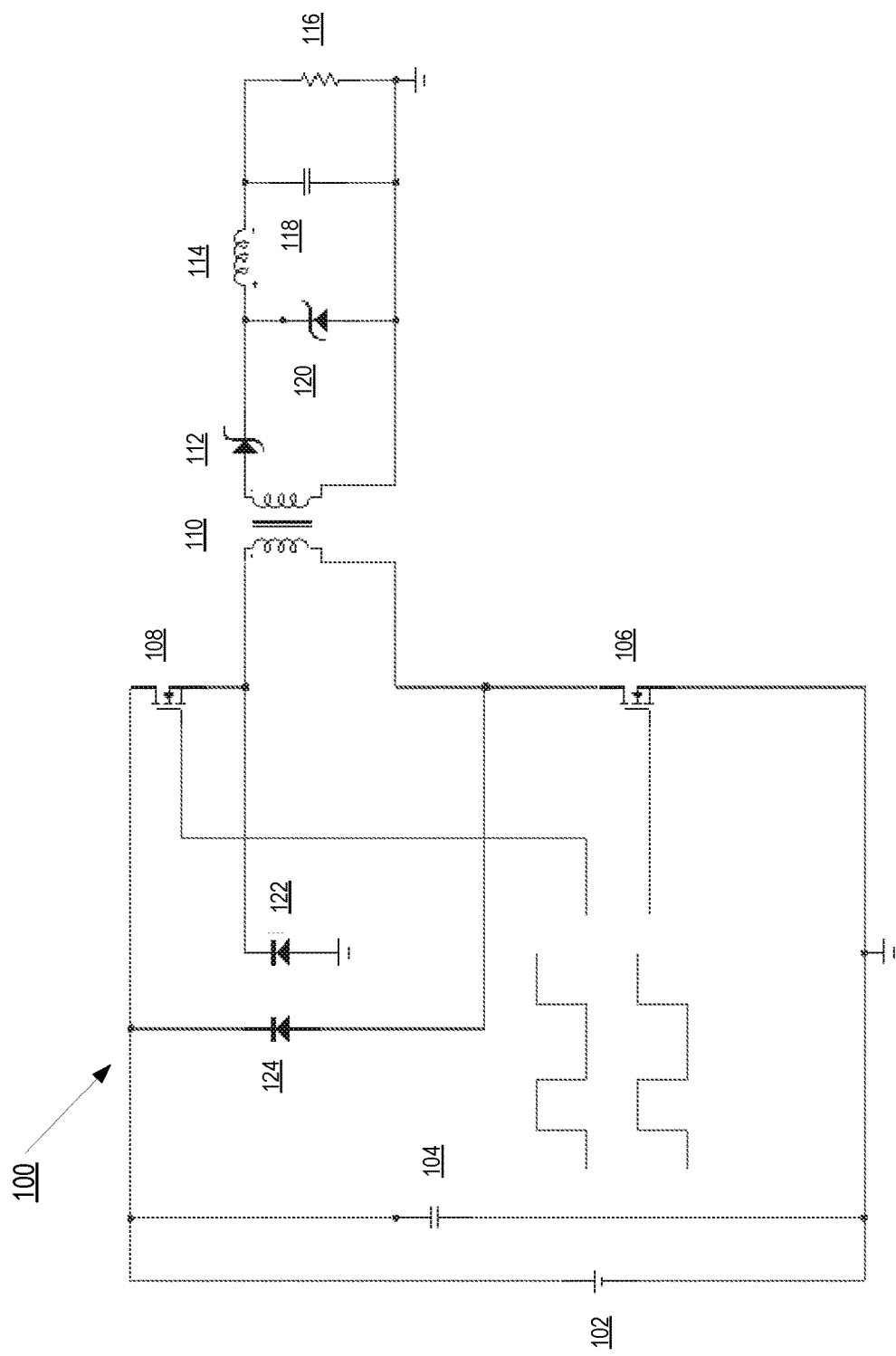
FIG. 1 is an example diagram of a dual switch topology for a power converter.

Exemplary methods, apparatus, and products for switching between a dual switch topology and a bridge forward topology of a power converter in accordance with the present invention are described with reference to the accompanying drawings, beginning with FIG. 1. FIG. 1 sets forth a dual switch topology 100 for a power converter.

The dual switch topology 100 includes an input voltage 102. The input voltage 102 may be generated by an alternating current (AC) section (not shown) of the power supply. The AC section may serve to rectify an alternating current and feed it to a boost circuit to create the input voltage 102. The input voltage 102 charges a capacitor 104. The dual switch topology 100 also includes field effect transistors (FETs) 106 and 108. The FETs 106 and 108 are configured to be turned on and off simultaneously (e.g., by a control signal provided to the gates of FETs 106 and 108).

Activation of the FETs 106 and 108 allows current in the primary winding of a transformer 110. The output winding of the transformer 110 is biased so that current will flow through the diode 112 and the inductor 114 to the Rload 116 and the capacitor 118. The voltage at the junction of the diode 112 and the diode 120 is averaged out by an LC filter formed by the inductor 114 and the capacitor 118.

When the FETs 106 and 108 turn off, the primary winding of the transformer 110 will swing to try to maintain current and cause current to flow through diodes 122 and 124. This will also reverse the bias of the output winding of the transformer 110. By reversing the bias of the output winding of the transformer 110, the flow of current through the diode 112 is halted. The junction of diodes 112 and 120 swings to just below ground, causing the diode 120 to maintain the current flowing through the inductor 114.

In this example dual switch topology 100, the duty cycle is limited to 50 percent. In typical implementations, the duty cycle varies from 25 percent at an input voltage 102 of 400V to 50 percent at an input voltage 102 of 200V.

Figure 2:
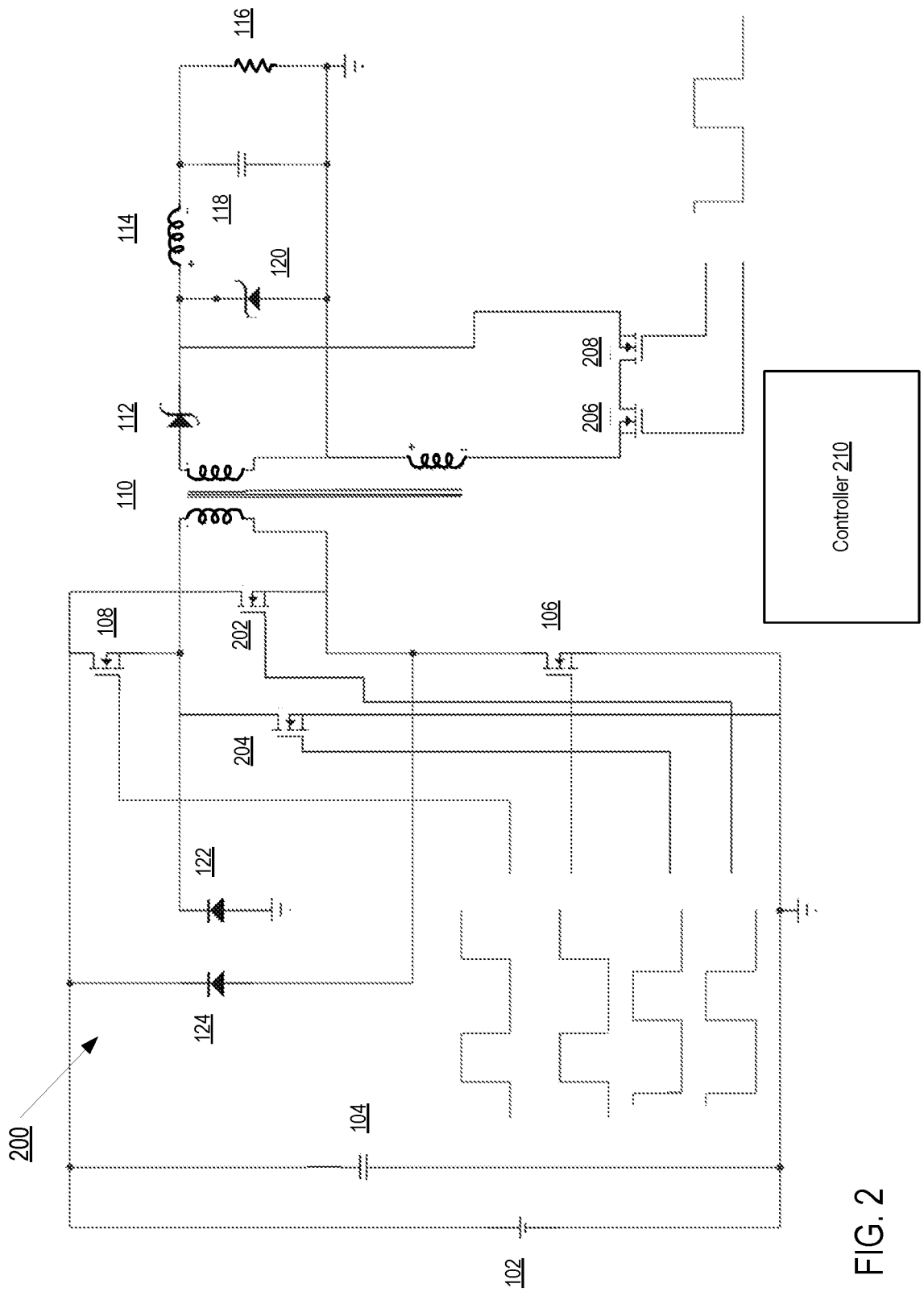
FIG. 2 is an example diagram of a switchable topology for a power converter.

FIG. 2 sets forth a switchable topology 200 for a power converter. The switchable topology allows for the power converter to operate using a dual switch topology or a bridge forward topology, depending on a state of the input voltage 102. The switchable topology 200 may be implemented in a power convertor. The power convertor may serve as a functional component of an apparatus or device. The switchable topology 200 includes the functional components of the dual switch topology 100, including the capacitor 104, FETs 106 and 108, the transformer 110, diodes 112, 120, 122, and 124, and the inductor 114.

The switchable topology 200 adds FETs 202 and 204 to the dual switch portion. To the output, the switchable topology 200 adds an additional output winding to the transformer 110, and also adds FETs 206 and 208. In order to control the operation of the FETs 106, 108, 202, 204, 206, and 208, the switchable topology 200 also includes a controller 210. The controller 210 comprises logic, circuitry, etc. configured to monitor the input voltage 102 and selectively activate the appropriate FETs to operate in a dual switch mode or bridge forward mode. Accordingly, the controller 210 may include solid state logic, processors, memory storing executable code, or combinations thereof.

When operating in dual switch mode (e.g., providing output voltage via a dual switch topology), the controller 210 turns on and off the FETs 106 and 108 simultaneously, as in the dual switch topology 100. FETs 202, 204, 206, and 208 remain in an off state in dual switch mode. When operating in bridge mode, the controller 210 will activate FETs 106 and 108 for a first portion of a cycle of the input voltage. For a second portion of the cycle, while FETs 106 and 108 are deactivated, the controller 210 will activate FETs 202, 204, 206, and 208 simultaneously. Thus, depending on the duty cycle implemented by the controller 210, either FETs 106 and 108 are activated, FETs 202, 204, 206, and 208 are activated, or each of FETs 106, 108, 202, 204, 206, and 208 are deactivated.

The duty cycle of the bridge forward mode at the time of switching from the dual switch mode may be based on the duty cycle of the dual switch mode. For example, in dual switch mode, assume a duty cycle of 50 percent for FETs 106 and 108. When switching to bridge forward mode, the controller 210 may halve the duty cycle of FETs 106 and 108 (e.g., 25 percent), and implement a matching duty cycle for FETs 202 and 204 (e.g., also 50 percent), thereby creating a net duty cycle matching the duty cycle of the dual switch mode at the time of transition (e.g., 50 percent). The controller will also activate/deactivate FETs 206 and 208 at the same time as FETs 202 and 204 to allow for current to flow through the secondary winding of the transformer 110.

The controller 210 may be configured to determine whether to switch from the dual switch mode to the bridge forward mode by determining if the input voltage 102 has fallen below a threshold (e.g., a first threshold). Determining if the input voltage 102 has fallen below a threshold may include determining if a charge of the capacitor 104 has fallen below the threshold. In response to the input voltage 102 falling below the threshold, the controller 210 may then switch from the dual switch mode to the bridge forward mode, thereby providing output voltage through a bridge forward topology.

The controller 210 may also be configured to determine whether to switch from the bridge forward mode to the dual switch mode satisfying another threshold (e.g., a second threshold). The first threshold and second threshold may be different in order to prevent alternating between the dual switch mode and the bridge forward mode due to narrow fluctuations in input voltage 102. For example, the controller 210 may be configured to switch from the dual switch mode to the bridge forward mode in response to the input voltage 102 falling below 300V. The controller 210 may also be configured to switch from the bridge forward mode to the dual switch mode in response to the input voltage 102 meeting or exceeding 310V. Thus, fluctuations in input voltage 102 above or below 300V would not result in repeated mode switches unless the 310V threshold was satisfied.

The controller 210 may be configured to switch from the dual switch mode to the bridge forward mode at the beginning of a cycle of the input voltage (e.g., when FETs 106 and 108 are activated). Thus, the transformer 110 is reset (flux reset to zero).

For example, assume a switchable topology 200 operating at a 50 percent duty cycle (e.g., FETs 106 and 108 simultaneously activated 50 percent of the time). In response to determining that the input voltage 102 has fallen below a threshold, the controller 210 enters a bridge forward mode. After the 50 percent deactivation period of FETs 106 and 108, the controller 210 activates FETs 106 and 108 at a 25 percent duty cycle, and activates FETs 202 and 204 at a 25 percent duty cycle that is active when FETs 106 and 108 are deactivated, thus providing for a net 50 percent duty cycle.

It is understood that the functional components of the switchable topology 200 are non-limiting examples, and that one or more components could be modified, added, or replaced without deviating from the scope of the invention. For example, one or more of the diodes 112, 120, 122, and 124 could be replaced with synchronous rectifiers.

Figure 3:
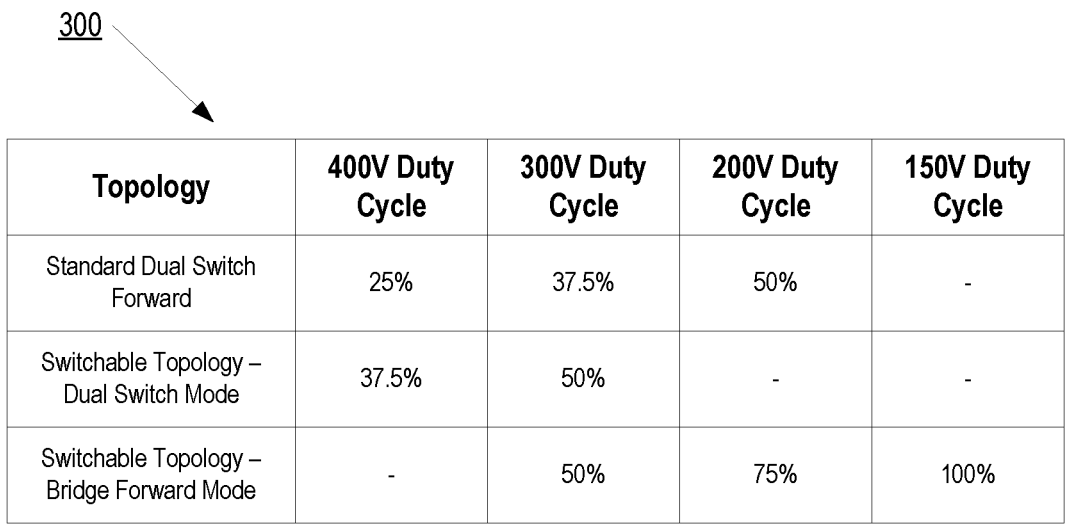
FIG. 3 is a table comparing performance metrics of a dual switch topology and a switchable topology.

FIG. 3 shows a table 300 comparing, for various input voltages 102, the optimal duty cycles of the dual switch topology 100 and the switchable topology 200 in dual switch mode and in bridge mode. The duty cycle for each of the input voltages represents an optimal duty cycle to maintain efficiency requirements and ride through time. For the dual switch topology 100, the most efficient (e.g., least root mean square (RMS) in switching FETs 106 and 108)) duty cycle of 50 percent is achieved at 200V, and running at 25 percent cycle at 400V. By running at 25 percent duty cycle at 400V, the RMS currents are higher in the primary winding of the transformer 110. In order to support the voltage required at a 25 percent duty cycle, the transformer 110 will also need more secondary turns.

In the switchable topology 200, the dual switch mode needs to only be tuned to a smaller range of voltages when compared to the dual switch topology 100. Accordingly, the duty cycle of the switchable topology 100 can operate at 37.5 percent. When compared to the dual switch topology, this reduces the peak current in the primary winding of the transformer 110 by 67 percent, thereby reducing the RMS current through FETs 106 and 108, improving overall efficiency. Also, the turns ratio of the transformer 110 can be reduced compared to the dual switch topology 100, thereby reducing losses in the transformer 110.

The table 300 assumes a threshold of around 300V that, when the input voltages 102 falls below it, the switchable topology 200 will switch to a bridge mode. When switching to bridge mode, the switchable topology 200 maintains a net duty cycle of 50 percent (e.g., 25 percent duty cycle for FETs 106 and 108, and 25 percent duty cycle for FETs 202 and 204), matching the duty cycle of the dual switch mode at the time of switching (e.g., 50 percent duty cycle for FETs 106 and 108. In bridge mode, the net duty cycle can then increase up to 100 percent, allowing the capacitor 104 to be drained to a lower voltage, and using more of the stored energy in the capacitor 104, thereby increasing the available ride through time.

Figure 4:
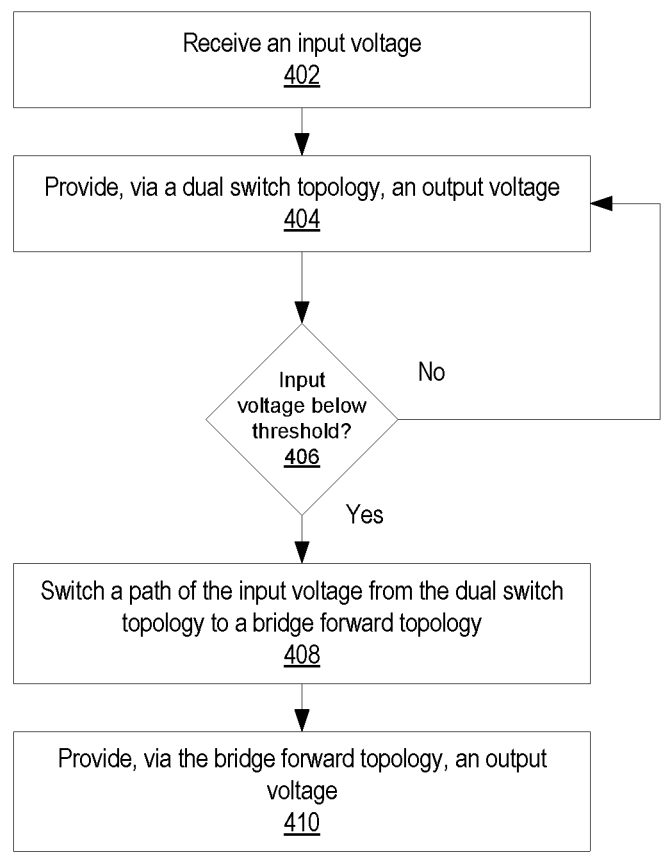
FIG. 4 is a flowchart of an example method.

For further explanation, FIG. 4 sets forth a flow chart illustrating an exemplary method for switching between a dual switch topology and a bridge forward topology in a power converter according to embodiments of the present invention that includes receiving 402 an input voltage 102. The method may also comprise providing 404, via a dual switch topology (e.g., of a power supply implementing a switchable topology 200), an output voltage. Providing, via a dual switch topology, an output voltage may comprise simultaneously activating and deactivating FETs 106 and 108 at a particular duty cycle. Simultaneously activating and deactivating FETs 106 and 108 at a particular duty cycle may comprise providing, by a controller 210, control signals to the gates of FETs 106 and 108 according to the duty cycle. Providing, via a dual switch topology, an output voltage may comprise maintaining FETs 202 and 204 in a deactivated state.

The method may also comprise determining 406 (e.g., by the controller 210) if the input voltage 102 falls below a threshold. Determining if the input voltage 102 falls below a threshold may include determining if a charge of a capacitor 104 falls below a threshold. If the input voltage 102 does not fall below the threshold (e.g., meets or exceeds the threshold), the power convertor continues to provide the output voltage via the dual switch topology. The method may also comprise, if the input voltage 102 falls below the threshold, switching 408 a path of the input voltage from the dual switch topology to a bridge forward topology.

Switching the path of the input voltage from the dual switch topology to the bridge forward topology may comprise activating, for a first portion of a cycle of the input voltage 102, FETs 106 and 108, and activating, for a second portion of the cycle of the input voltage 102 when FETs 106 and 108 are deactivated, FETs 202 and 204). The exemplary method may also include providing 410 the output voltage via the bridge forward topology.

For further explanation, FIG. 5 sets forth a flow chart illustrating an exemplary method for switching between a dual switch topology and a bridge forward topology in a power converter according to embodiments of the present invention that includes receiving 402 an input voltage 102; providing 404 via a dual switch topology, an output voltage; determining 406 if the input voltage 102 falls below a threshold (e.g., a first threshold); switching 408, if the input voltage 102 falls below a threshold, a path of the input voltage 102 from the dual switch topology to a bridge forward topology; and providing 410, via the bridge forward topology, the output voltage.

Figure 5:
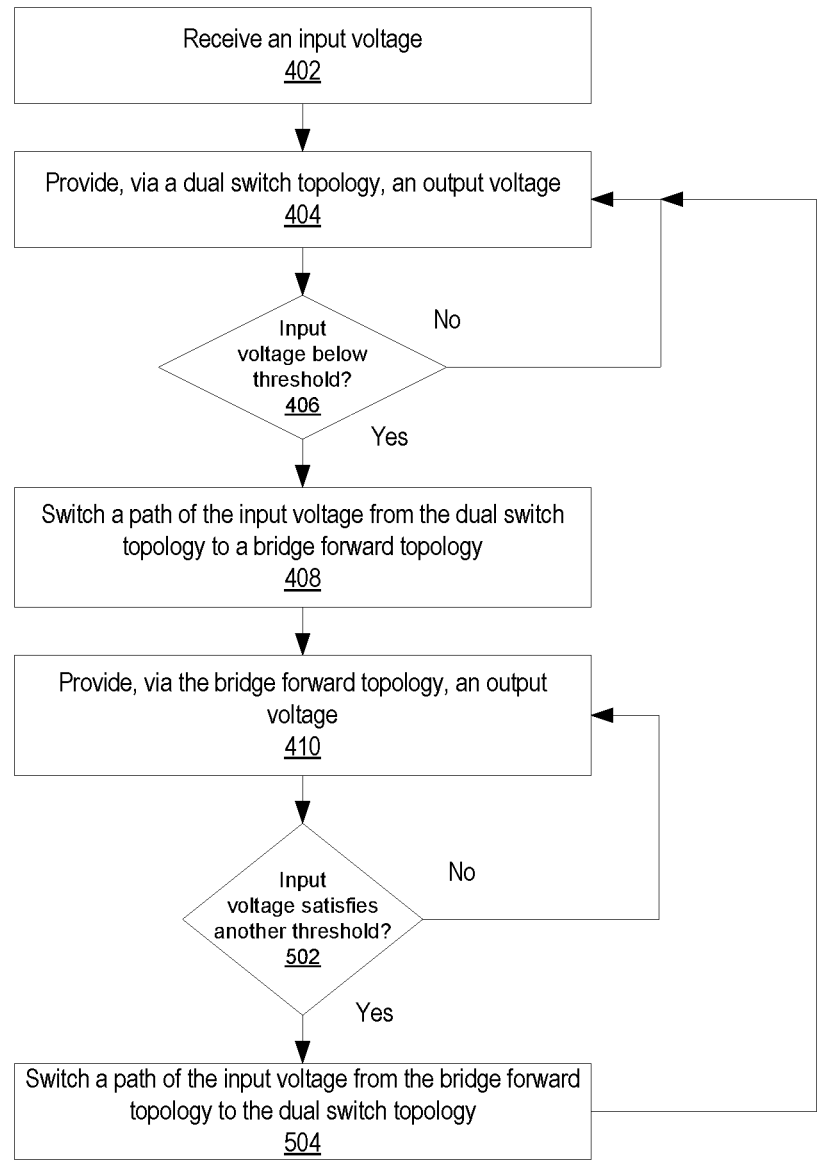
FIG. 5 is a flowchart of an example method.

FIG. 5 differs from FIG. 4 in that the method may also comprise determining 502 (e.g., by the controller 210) if the input voltage 102 satisfies another threshold (e.g., a second threshold). Determining 502 if the input voltage 102 satisfies the other threshold may include determining if a charge of the capacitor 104 satisfies the other threshold. Determining 502 if the input voltage 102 satisfies the other threshold may comprise determining if the input voltage 102 satisfies a second threshold different from the first threshold to which the input voltage 102 was compared at step 406. The exemplary method may comprise continuing to provide 410, if the input voltage 102 fails to satisfy the other threshold, the output voltage via the bridge forward topology.

The exemplary method may also comprise switching 504, if the input voltage 102 satisfies the other threshold, the path of the input voltage 102 from the bridge forward topology to the dual switch topology. Switching 504, if the input voltage 102 satisfies the other threshold, the path of the input voltage 102 from the bridge forward topology to the dual switch topology may include maintaining FETs 202 and 204 in a deactivated state. Switching 504, if the input voltage 102 satisfies the other threshold, the path of the input voltage 102 from the bridge forward topology to the dual switch topology may simultaneously activating and deactivating FETs 106 and 108 according to a duty cycle.

Simultaneously activating and deactivating FETs 106 and 108 according to a duty cycle may include simultaneously activating FETs 106 and 108 at the beginning of a cycle of the input voltage 102. The exemplary method may also comprise, after switching the path of the input voltage 102 from the bridge forward topology to the dual switch topology, providing 404, via the dual switch topology, the output voltage.

For further explanation, FIG. 6 sets forth a flow chart illustrating an exemplary method for switching between a dual switch topology and a bridge forward topology in a power converter according to embodiments of the present invention that includes receiving 402 an input voltage 102; providing 404 via a dual switch topology, an output voltage; determining 406 if the input voltage 102 falls below a threshold (e.g., a first threshold); switching 408, if the input voltage 102 falls below a threshold, a path of the input voltage 102 from the dual switch topology to a bridge forward topology; and providing 410, via the bridge forward topology, the output voltage.

Figure 6:
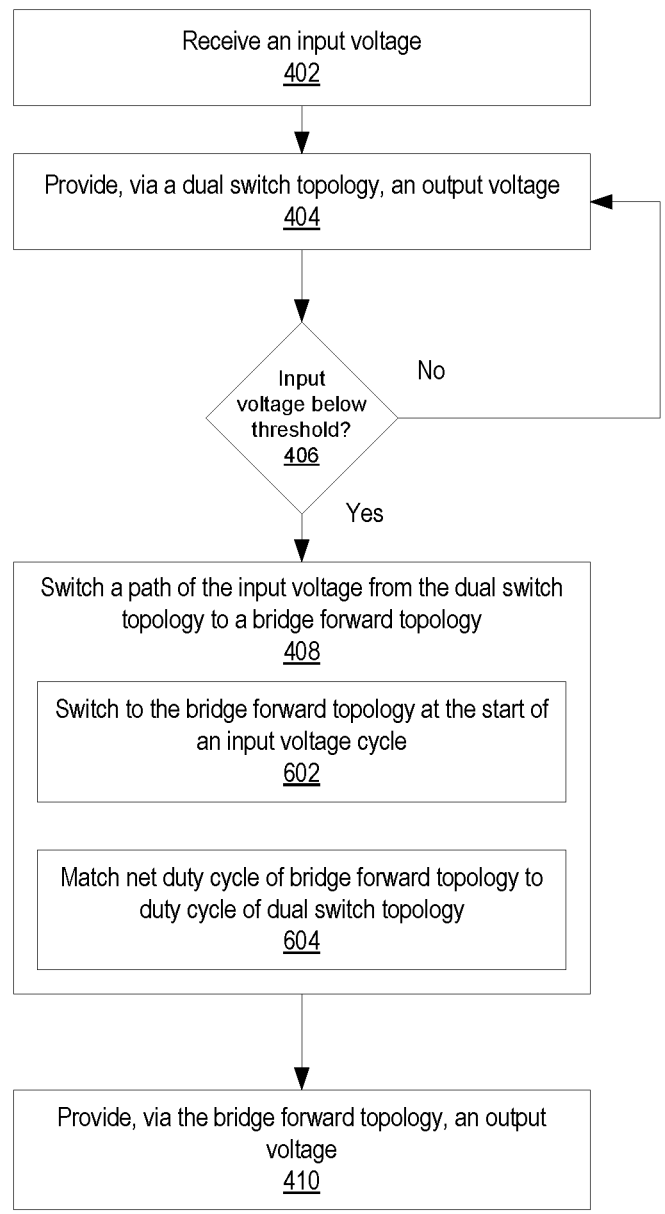
FIG. 6 is a flowchart of an example method.

FIG. 6 differs from FIG. 4 in that switching 406 a path of the input voltage from the dual switch topology to the bridge forward topology comprises switching 602 the path of the input voltage to the bridge forward topology at the start of a cycle of the input voltage; and matching 604, at the time of the switch, the net duty cycle of the bridge forward topology to the duty cycle of the dual switch topology. Switching the path of the input voltage to the bridge forward topology at the start of a cycle can comprise activating one or more FETs used in the bridge forward topology (e.g., FETs 106 and 108) after completing a last cycle in the dual switch mode (e.g., after completing the deactivation period of FETs 106 and 108 in dual switch mode).

Matching the net duty cycle of the bridge forward topology to the duty cycle of the dual switch topology may comprise activating one or more FETs used in the dual switch topology (e.g., FETs 106 and 108) at half the duty cycle of the dual switch topology. Matching the net duty cycle of the bridge forward topology to the duty cycle of the dual switch topology may also comprise activating one or more FETs used in the bridge forward topology and not used in the dual switch topology (e.g., FETs 202 and 204) at half the duty cycle of the dual switch topology. Thus, the net duty cycle of the bridge forward topology (two combined half duty cycles of the dual switch topology) matches the duty cycle of the dual switch topology.

For example, assume that it is determined (e.g., by the controller 210) to switch the path of the input voltage from the dual switch topology to the bridge forward topology when the dual switch topology is operating at a 50 percent duty cycle of FETs 106 and 108. At the start of the first cycle of the input voltage when using the bridge forward topology, the controller 210 activates FETs 106 and 108 at a 25 percent duty cycle, half of the 50 percent duty cycle used in dual switch mode. The controller 210 also activates FETs 202 and 204 at a 25 percent duty cycle, timed such that FETs 202 and 204 are activated when FETs 106 and 108 are deactivated. Thus, the bridge forward topology uses a net 50 percent duty cycle across FETs 106, 108, 202, and 204. Note that, in cycles subsequent to the first cycle of the bridge forward topology, the net duty cycle of the bridge forward topology may diverge (e.g., increase or decrease) relative to the duty cycle last used by the dual switch topology.

In view of the explanations set forth above, readers will recognize that the benefits of switching between a dual switch topology and a bridge forward topology of a power converter according to embodiments of the present invention include:

The dual switch topology portion of the switchable topology needs to be tuned to a smaller range of input voltages when compared to a purely dual switch topology, allowing for increased efficiency and the ability to run at higher duty cycles.

When using the bridge forward topology, a power converter may operate at higher duty cycles and draw more power from capacitors, increasing the ride through time available to the power converter.

Exemplary embodiments of the present invention are described largely in the context of a fully functional computer system for switching between a dual switch topology and a bridge forward topology of a power converter. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of switching between a dual switch topology and a bridge forward topology in a power converter, the method comprising:
   receiving an input voltage;
   providing, via the bridge forward topology, an output voltage;
   determining that the input voltage satisfies a threshold;
   switching a path of the input voltage from the bridge forward topology to the dual switch topology; and
   providing, via the dual switch topology, the output voltage.

2. The method of claim 1 further comprising:
   determining that the input voltage satisfies another threshold;
   switching the path of the input voltage from the dual switch topology to the bridge forward topology; and
   providing, via the bridge forward topology, the output voltage.

3. The method of claim 2, wherein the other threshold is different from the threshold.

4. The method of claim 2, wherein switching the path of the input voltage from the dual switch topology to the bridge forward topology comprises matching a net duty cycle of the bridge forward topology to a duty cycle of the dual switch topology.

5. The method of claim 4, wherein matching the net duty cycle of the bridge forward topology to the duty cycle of the dual switch topology comprises:
   activating one or more first field effect transistors (FETs) included in the dual switch topology and the bridge forward topology at half of the duty cycle of the dual switch topology; and
   activating one or more second FETs not included in the dual switch topology and included in the bridge forward topology at the half of the duty cycle of the dual switch topology.

6. The method of claim 1, wherein switching the path of the input voltage from the bridge forward topology to the dual switch topology comprises switching, at a beginning of a cycle of the input voltage, the path of the input voltage from the bridge forward topology to the dual switch topology.

7. The method of claim 1, wherein determining that the input voltage satisfies the threshold comprises determining of the charge on a capacitor satisfies the threshold.

8. A power convertor for switching between a dual switch topology and a bridge forward topology, the power convertor configured for:
   receiving an input voltage;
   providing, via the bridge forward topology, an output voltage;
   determining that the input voltage satisfies a threshold;
   switching a path of the input voltage from the bridge forward topology to the dual switch topology; and
   providing, via the dual switch topology, the output voltage.

9. The power convertor of claim 8, further configured for:
   determining that the input voltage satisfies another threshold;
   switching the path of the input voltage from the dual switch topology to the bridge forward topology; and
   providing, via the bridge forward topology, the output voltage.

10. The power convertor of claim 9, wherein the other threshold is different from the threshold.

11. The power convertor of claim 9, wherein switching the path of the input voltage from the dual switch topology to the bridge forward topology comprises matching a net duty cycle of the bridge forward topology to a duty cycle of the dual switch topology.

12. The power convertor of claim 11, wherein matching the net duty cycle of the bridge forward topology to the duty cycle of the dual switch topology comprises:
   activating one or more first field effect transistors (FETs) included in the dual switch topology and the bridge forward topology at half of the duty cycle of the dual switch topology; and
   activating one or more second FETs not included in the dual switch topology and included in the bridge forward topology at the half of the duty cycle of the dual switch topology.

13. The power convertor of claim 8, wherein switching the path of the input voltage from the bridge forward topology to the dual switch topology comprises switching, at a beginning of a cycle of the input voltage, the path of the input voltage from the bridge forward topology to the dual switch topology.

14. The power convertor of claim 8, wherein determining that the input voltage satisfies the threshold comprises determining of the charge on a capacitor satisfies the threshold.

15. An apparatus, comprising:
   a power convertor for switching between a dual switch topology and a bridge forward topology, the power convertor configured for:
   receiving an input voltage;
   providing, via the bridge forward topology, an output voltage;
   determining that the input voltage satisfies a threshold;

switching a path of the input voltage from the bridge forward topology to the dual switch topology; and providing, via the dual switch topology, the output voltage.

16. The apparatus of claim 15, wherein the power convertor is further configured for:

determining that the input voltage satisfies another threshold;

switching the path of the input voltage from the dual switch topology to the bridge forward topology; and providing, via the bridge forward topology, the output voltage.

17. The apparatus of claim 16, wherein the other threshold is different from the threshold.

18. The apparatus of claim 16, wherein switching the path of the input voltage from the dual switch topology to the bridge forward topology comprises matching a net duty cycle of the bridge forward topology to a duty cycle of the dual switch topology.

19. The apparatus of claim 18, wherein matching the net duty cycle of the bridge forward topology to the duty cycle of the dual switch topology comprises:

activating one or more first field effect transistors (FETs) included in the dual switch topology and the bridge forward topology at half of the duty cycle of the dual switch topology; and activating one or more second FETs not included in the dual switch topology and included in the bridge forward topology at the half of the duty cycle of the dual switch topology.

20. The apparatus of claim 15, wherein switching the path of the input voltage from the bridge forward topology to the dual switch topology comprises switching, at a beginning of a cycle of the input voltage, the path of the input voltage from the bridge forward topology to the dual switch topology.

* * * * *